(12) United States Patent
Bolz

(10) Patent No.: US 8,157,522 B2
(45) Date of Patent: Apr. 17, 2012

(54) CALIBRATION METHOD

(75) Inventor: Detlef Bolz, Gross Gronau (DE)

(73) Assignee: Repower Systems AG, Hamburg (DE)

( * ) Notice: Subject to any disclaimer, the term of this patent is extended or adjusted under 35 U.S.C. 154(b) by 599 days.

(21) Appl. No.: 12/375,473

(22) PCT Filed: Jul. 27, 2007

(86) PCT No.: PCT/EP2007/006671
§ 371 (c)(1),
(2), (4) Date: Jan. 28, 2009

(87) PCT Pub. No.: WO2008/014935
PCT Pub. Date: Feb. 7, 2008

(65) Prior Publication Data
US 2009/0263246 A1 Oct. 22, 2009

(30) Foreign Application Priority Data
Aug. 1, 2006 (DE) .......................... 10 2006 036 157

(51) Int. Cl.
*B63H 3/00* (2006.01)
(52) U.S. Cl. .............................. 416/35; 416/61; 415/118
(58) Field of Classification Search ................ 415/1, 30, 415/33, 118; 416/135, 61, 1, 35
See application file for complete search history.

(56) References Cited

U.S. PATENT DOCUMENTS
6,940,186 B2 * 9/2005 Weitkamp ...................... 290/44

FOREIGN PATENT DOCUMENTS

| | | |
|---|---|---|
| CN | 1461882 A | 12/2003 |
| DE | 19739162 A1 | 3/1999 |
| DE | 19739164 A1 | 3/1999 |
| DE | 10219664 A1 | 11/2003 |
| EP | 0995904 A2 | 4/2000 |
| EP | 1359321 A1 | 11/2003 |
| WO | 99/57435 | 11/1999 |
| WO | 01/33075 | 5/2001 |
| WO | 2004/074679 | 9/2004 |
| WO | 2005/111414 | 11/2005 |

OTHER PUBLICATIONS

DIN 1319-1: Grundlagen der Messtechnik Teil 1: Grundbegriffe, Jan. 1995 (an industrial norm by the German Institute for Standardization).

* cited by examiner

*Primary Examiner* — Kiesha Bryant
*Assistant Examiner* — Mark Tornow
(74) *Attorney, Agent, or Firm* — Rankin, Hill & Clark LLP

(57) ABSTRACT

The invention relates to a method for the calibration of at least one sensor (11-14) of a wind power plant (10). The invention also relates to a wind power plant (10). The calibration process according to the invention is captured by the at least one sensor (11-14). The measurement value (30, 31), which is a measure for the load of a component (15-17), is evaluated, wherein the wind power plant has at least the moveable component (15, 15', 15", 16, 17), wherein the component (15-17) is pivoted or rotated around a predeterminable axis (19, 20). The wind power plant according to the invention is provided with a calibration module for the automatic calibration of at least one sensor (11-14), which measures the load of a movable component (15-17) of the wind power plant.

21 Claims, 3 Drawing Sheets

CALIBRATION METHOD

BACKGROUND OF THE INVENTION

1. Field of the Invention

The invention relates to a calibration process of at least one sensor of a wind power plant and a corresponding wind power plant.

2. Description of Related Art

Due to the continuously growing size of rotors of wind power plants, control strategies for the minimization of loads on the wind power plant, in particular a control strategy for a blade revolution pitch, continue to gain in importance. For example, each rotor blade is hereby individually turned into the wind (pitched) during the revolution so that the total mechanical load, which is conveyed into the tower via the rotor shaft and the nacelle, can be minimized. As an important measurement variable, blade bending moments are hereby required for each rotor blade or other bending moments of the wind power plant, for example on a generator shaft or the rotor hub or other rotating parts. Corresponding load measurements are also required by corresponding sensors for load measurements of the wind power plant.

Sensors can hereby not be attached one hundred percent exactly at the location where they should be attached, and the sensor properties can change over time so that a calibration of the sensors is necessary, which is normally performed manually. The load on the rotor blade root in modern wind power plants is mainly characterized by a superimposition of the bending moments from aerodynamics (mainly perpendicular to the rotor plane, according to the impact moment) and the bending moment, which from the tare weight of the rotor blades, mainly in the rotor plane (swing moment) and normal forces resulting from the tare weight and the centrifugal force (depending on the rotor speed) and forces and moments from the dynamic of the rotors, which are of particular importance when there are undesired vibrations (see DE 102 19 664 A1).

In order to perform load measurements, strain gauges are normally used, which are normally connected such that only bending strains, but not normal forces from temperature strains or centrifugal forces, are taken into consideration. The calibration of the blade root bending moments takes place against the gravity bending moment from the known mass and the known center of gravity distance of the blade from the measurement point when the rotor blade is placed horizontal. In order to determine the zero point of the bending moment measurements, the rotor blade is set vertically or, alternatively, horizontally, wherein the rotor blade is rotated around the rotor blade longitudinal axis (pitched) in order to determine the zero point for the horizontal positioning. The impact or swing bending moment is accessible by rotating the blade pitch angle by 90°, which the selected calibration method can easily do. Thus, for selection and calibration, the system must be shut down for a short period of time according to the article entitled "Messung von Lastkollektiven in einem Windpark" (Measurement of Load Collectives in a Wind Farm) by H. Seifert and H. Söker in DEWI, 1994, pages 399 through 402. For this, the data is output via a notebook and evaluated accordingly in order to perform a calibration.

BRIEF SUMMARY OF THE INVENTION

The object of the present invention is to specify a calibration method of at least one sensor of a wind power plant and a wind power plant, by means of which it is efficiently possible to obtain reliable data on loads and components of the wind power plant.

This object is solved through a method for the calibration of at least one sensor of a wind power plant, wherein the wind power plant has at least one movable component, wherein the component is pivoted or rotated on a predeterminable axis and wherein a measurement value, which is a measure for the load of the component, captured by the at least one sensor is evaluated. The evaluation hereby includes, in particular, a comparison of the measurement value adjusted by a calibration function with a specifiable and/or saved setpoint value or a reference, which can be a function, a value or a matrix. The calibration function can be a factor or a matrix or a function, which is dependent on one or more operating parameters of the wind power plant.

When the evaluation includes that, in the case of a deviation of the measurement value adjusted by a calibration function from a specifiable and/or saved and/or determined reference, which is greater than a specifiable deviation threshold value, the measurement value adjusted by the calibration function is the basis for the creation and saving of an adjusted calibration function, it is possible in the case of changing framework conditions to appropriately adjust the calibration function in the case of an increasing temperature and/or a temperature drift of a corresponding sensor or in the case of an aging effect of the sensor or other effects, which lead to undesired measurement effects and measurement effects causing incorrect moments. The calibration function is hereby in particular updated, wherein the previous saved calibration function is taken as the starting point and a new calibration function is determined based on it, and is saved accordingly if applicable. Within the framework of the invention, the deviation threshold value is also understood in particular as the term deviation setpoint value. When the deviation setpoint value is discussed below, a deviation threshold value is also meant.

Alternatively, an advantageous embodiment of the invention provides that the reference is designed such that it can be directly compared with the sensor measurement data. The advantage of this process is that an existing, saved calibration function does not need to be accessed in order to determine the new, adjusted calibration function. The calculation of the calibration function can then be more complex. The raw sensor data then only needs to be averaged (e.g. temporal average of measurement values captured with a high sample rate), if applicable, in order to obtain sensor measurement data comparable with the reference.

The calibration method is especially efficient when a plurality of measurement values of the at least one sensor is recorded or evaluated during the pivoting or rotation of the component. This enables a very exact adjustment of the calibration function.

The reference preferably comprises a plurality or a function of setpoint values, which are specifiable and/or saved and/or determined. If the creation and the saving of an adjusted calibration function are repeated, in particular preferably multiple times, a secure measurement result is given.

It is particularly preferred and of its own inventive value when the evaluation and/or the calibration process takes place or is executed automatically. Within the framework of the invention, automatic occurrence is in particular understood in that it can be performed without action from an operating person, i.e. the evaluation and/or the calibration process is performed automatically after an initiation signal, which can possibly also be given by an operating person, i.e. without further action from the operating person, wherein the result can then be a new calibration function but also just the presence of corresponding load measurement values, which are used for the control and/or regulation of the wind power plant. The initiation signal of the evaluation and/or the calibration process can also be created without the aid of an operating person, for example when there is a predeterminable time interval and/or advantageous environmental conditions, for example a wind speed that lies below a specifiable threshold speed like 7 m/s and/or an individual event, e.g. an abnormal signal deviation, such as drifting of a sensor signal after a plausibility check, correspondingly specifiable temperature fluctuation, an emergency stop or a manual request.

The measurement values are preferably recorded with a frequency of 0.01 to 1000 Hz, in particular 10-500 Hz.

Furthermore, the measurement values are preferably recorded over the entire range of the pivoting or rotating, resulting in a very exact calibration process.

The component is preferably a rotor blade and/or a hub and/or a shaft of a wind power plant. The axis is preferably a rotor shaft axis or a rotor blade longitudinal axis. The method is particularly efficient when the component is a rotor blade and the pivoting or rotating occurs over more than 90°, in particular more than 100°, in particular more than 120°, in particular more than 180°, in particular more than 270°, in particular more than 360°. A very exact calibration process is possible when the component is a hub and/or a shaft, wherein the pivoting or rotating occurs over several revolutions.

When an error signal is created, inasmuch as a preceding calibration process in a specifiable number of iterations repeatedly leads to the fact that the deviation of the measurement value adjusted with the calibration function from the reference is greater than a specifiable deviation setpoint value, it is easy to identify defective sensors. A plurality or a function and an interpolation of the measurement values can hereby be provided.

The calibration process can preferably be performed on an idle wind power plant if the calibration needs to be performed by sensors on the rotor blade or on the rotor blade root or on the rotor blade flange.

For the calibration of these sensors, a trundling wind power plant can also be provided, i.e. a wind power plant, the rotor blades of which rotate slowly around the rotor axis. The individual measurement values can then be compared with the reference, and namely after use of the calibration function on the measurement values, for example multiplication of the calibration function with the measurement values or another operation that can be provided accordingly. The reference can in particular be a function, but also an individual value. The calibration process can thus also be performed on a trundling, i.e. slowly moving, wind power plant, wherein the calibration function can hereby be determined through statistics, in particular multiple performances of the calibration, in order to compensate, for example, for uneven wind strengths and uneven speeds. An assessment is hereby provided with an average value and a standard deviation. A corresponding repetition of the calibration should preferably be performed until a specified accuracy is reached.

It can also be provided to hold two rotor blades at a lower and more constant speed when there is little wind, while the third rotor blade is calibrated rotating around the pitch axis, wherein correspondingly fast control algorithms are naturally needed in order to actually maintain a constant speed and in order to thus be able to implement the calibration accordingly exactly. For this, the performance of several completed calibration processes is also recommended in order to obtain sufficiently good statistics. A completed calibration process is understood to be a complete run-through of the calibration process, in which for example, the measurement values determined by the sensors are converted into loads on the component, i.e. are applied to the calibration function or the calibration function is applied to the measurement value. A pivoting of a rotor blade from −190° to +190° or from 0° to +92° can hereby be provided for example. The thereby determined measurement values are then further processed accordingly, wherein the calibration process is complete at +190° or at 92°, in order to remain with the examples. Repeated run-throughs of the calibration process can then be provided for better statistics.

This process is preferably performed, one after the other, for all blades and preferably in particular multiple times until a sufficient calibration accuracy is reached. The calibration process is preferably performed when there is little wind in order to ensure no or little output loss and an increased accuracy. When there is no wind, it is preferred that the rotor is positioned accordingly via motor-driven drives so that, for example, the sensors of a rotor blade can be calibrated, wherein the rotor blade longitudinal axis is then mainly placed horizontal.

In the case of normally used or usable sensors, an offset, a slope and if applicable a nonlinearity and a false positioning of the sensors will need to be calibrated. A coordinate transformation can take place in the case of a false positioning of the sensors.

The object is also solved through a method for the operation of a wind power plant including a calibration process of at least one sensor, in particular as described above, wherein the calibration process is executed automatically. Within the framework of the invention, an automatic execution of the calibration process means, in particular, that it is performed or completed without action from an operating person. We refer, in particular, to the above definition of an automatic calibration process. The at least one sensor is preferably a load sensor.

A control and/or regulation device and also a calibration module are also preferably provided, wherein the calibration module performs the calibration of the measurement values and transfers the calibrated values to the control and/or regulation device as input parameters. The operation of the wind power plant is controlled and/or regulated by means of the control and/or regulation device. The control and/or regulation device can be or include the operating control.

The calibration process is preferably initiated by a calibration signal. The calibration module is preferably integrated in the control and/or regulation device, whereby fast processing is possible.

The wind power plant is preferably stopped after the initiation of the calibration process by the calibration signal. The calibration process described above can hereby be performed. The wind power plant can also be further operated while trundling after the initiation of the calibration process, wherein several measurement series are then preferably performed in order to obtain statistics that are meaningful and sufficiently exact. A rotor blade of a wind power plant is preferably brought into a specifiable position after the initiation of the calibration process by the calibration signal. The bringing into a specifiable position preferably occurs through movement around two movement axes: on one hand through rotation around the tower vertical axis by the wind azimuth system, whereby the rotor plane is brought into a predetermined angle with respect to the wind direction, preferably perpendicular to the wind direction (approx. 90°) or perpendicular (approx. 90°) to the perpendicular of the rotor plane. Further through rotation around the rotor axis, wherein the rotor blade to be calibrated is brought into a specifiable angle to the horizontal, in particular into a horizontal position.

The object is also solved through a wind power plant with a calibration module for, in particular automatic, calibration of at least one sensor, which measures the load of a moveable component of the wind power plant.

The calibration module is preferably designed for the execution of a calibration process, as described above. A control and/or regulation device is also preferably provided, which is connected with the calibration module or into which the calibration module is integrated so that the wind power plant can be controlled or regulated by the control and/or regulation device, and namely depending on the measurement signals of corresponding load sensors calibrated by the calibration module.

The invention is described below, without restricting the general intent of the invention, based on exemplary embodiments in reference to the drawings. We expressly refer to the drawings with regard to the disclosure of all details according to the invention that are not explained in greater detail in the text.

DETAILED DESCRIPTION OF THE INVENTION

The calibration of a system is the identification and determination of a functional connection between an enumerable or measurable variable and an object property to be determined. In the exemplary embodiments according to FIG. 1 through 7, a measurement variable monotonously changing with the blade bending moment, e.g. a bridge voltage of a strain gauge strip measurement bridge, is set in relation to a known static blade bending moment. After delivery of a rotor blade, there is generally a weight protocol from the manufacturer for each individual rotor blade. The center of gravity distance to the blade flange and the total blade weight can be obtained from this.

The calibration of the measurement variable is necessary because in the hitherto implemented measurement processes no fixed transfer function of the values resulting from the measurement signals of sensors to corresponding moments could be defined. When, for example, the blade strain in the cylindrical part of the blade root is measured, then the strain value could not previously be calculated back accurately enough to the real bending moment due to the inhomogeneity of the fiber composite material. Moreover, Wheatstone measurement bridges get out of tune easily so that each adjustment of the measurement point requires a recalibration.

Figure 1:
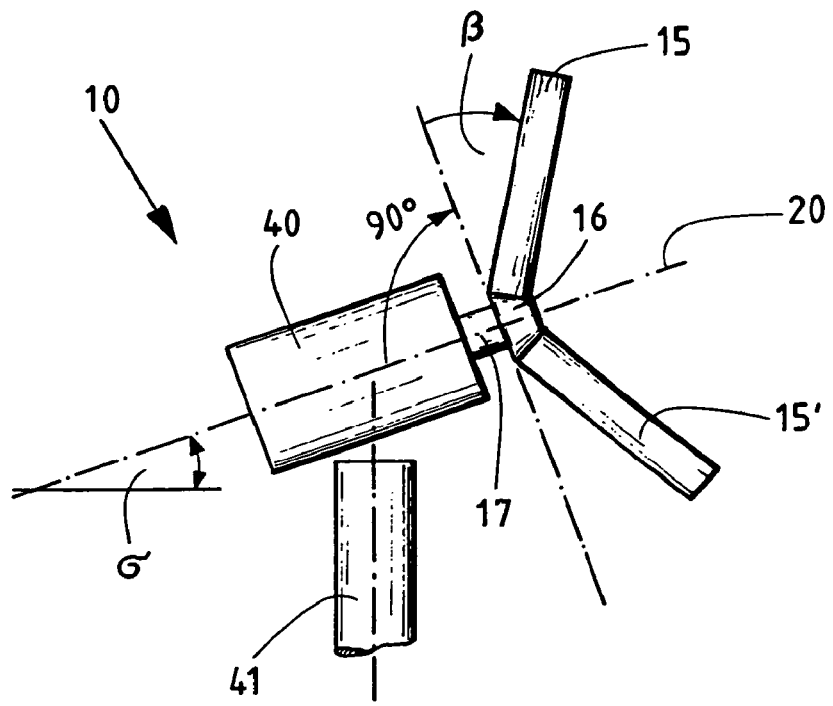
FIG. 1 shows a schematic representation of a wind power plant.

FIG. 1, which shows a schematic representation of part of a wind power plant 10, is provided to define terms. A nacelle 40 is positioned on a tower 41, which is shown schematically. A shaft axis 20, which is aligned with an angle σ, which defines an axis tilt, to the horizontal, is provided in the nacelle 40. A shaft 17 is connected with rotor blades 15, 15' via a hub 16. The rotor blades 15, 15' stick out from the perpendicular of the shaft axis 20 with a cone angle β.

Figure 2:
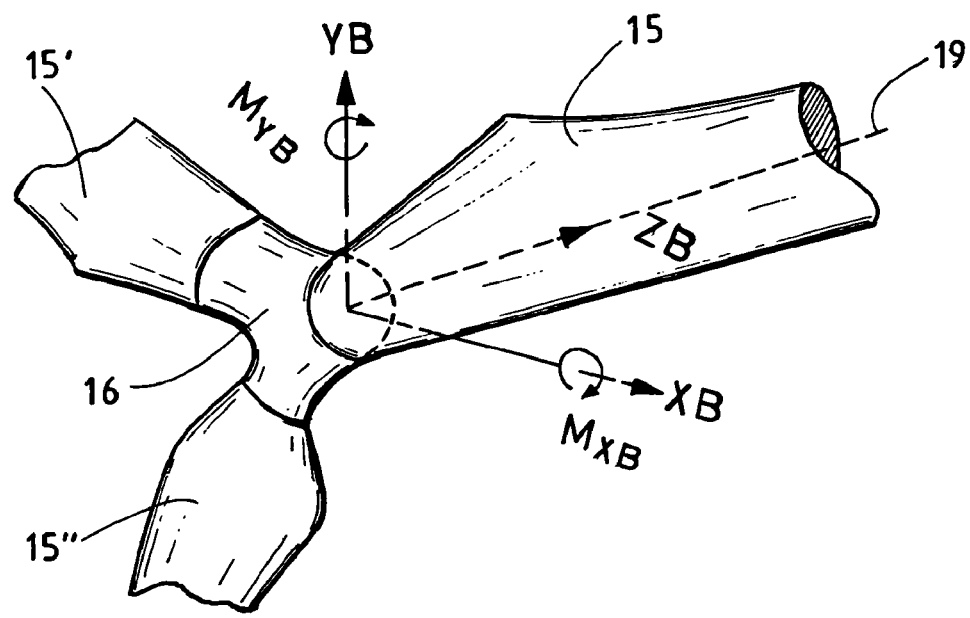
FIG. 2 shows a schematic representation of a part of a wind power plant.

FIG. 2 shows a schematic view of part of rotor blades 15 through 15" and a hub 16, with which the coordinate system of the blade flange should be shown. The rotational axis of the rotor blade is specified by ZB. The orthogonal axes here are XB and YB. A rotation on axis YB gives an impact moment (Schlagmoment), which is specified with $M_{YB}$ and one that represents moment on axis YB. YB lies in the plane which is spanned by the rotor blade longitudinal axes. Within the framework of the invention, $M_{YB}$ is also called $M_F$. The engagement direction of the force belonging to this moment is in direction XB. The moment around axis XB correspondingly defines the swing moment (Schwenkmoment), which is specified with $M_{XB}$ and is also called $M_S$ within the framework of the invention. The engagement direction of the force of this moment is in the direction of axis YB.

During operation, an impact and swing moment affects each rotor blade 15 through 15" relating to the blade flange coordinate system according to FIG. 2. The swing moment mainly results from the weight load of the rotor blade; a share also comes from the torque driving the rotor. The impact moment is created from the wind load on the rotor. If the rotor blade 15, 15' or 15" is turned (pitched) aerodynamically from the wind during regulation, then this moment can be decreased in the impact direction. A rotor blade has a tare weight moment MBL, which results from the multiplication of the center of gravity distance from the rotor hub to the center of gravity of the rotor blade with the total blade mass and the gravitation acceleration (for example 9.81 m/s$^2$).

The center of gravity distance to the sensor position should preferably be taken into consideration for the referencing of the sensor signals. Both geometric data (axis tilt, sensor position and orientation, blade and/or rotor position) as well as component parameters (mass, center coordinates, potential structure data, if deviating from the simplified assumption of even load distribution in the cylindrical blade root) should generally be taken into consideration for the reference.

Figure 3:
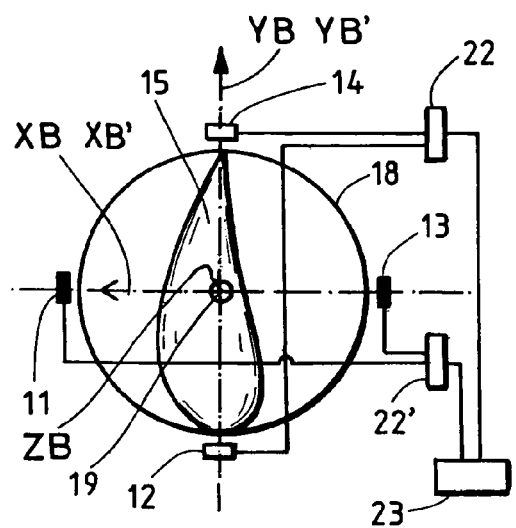
FIG. 3 shows a schematic view of a rotor blade from the blade flange into a horizontally positioned rotor blade.
Figure 4:
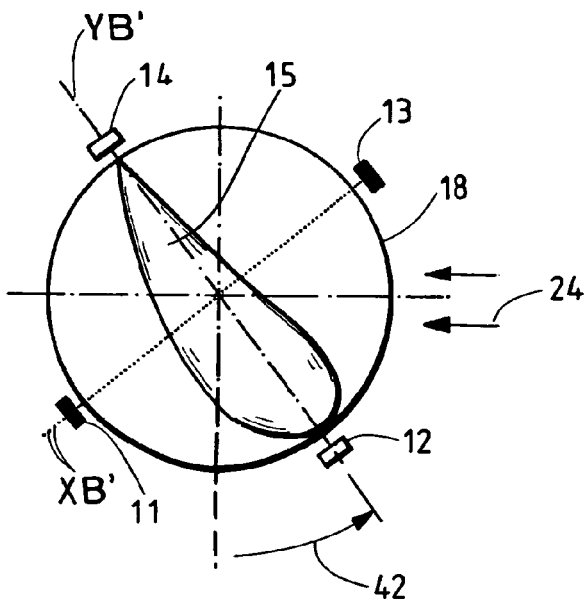
FIG. 4 shows a representation as in FIG. 3 just with a different alignment or a different pitch angle of the rotor blade.

It has been proven in the measurement practice to attach or arrange strain gauges on the inner wall of the rotor blade in the cylindrical part of the rotor blades near the blade flange. Alternatively, other sensors, for example measurement strain bolts of the blade flange bearing connection or other strain gauges, can also be used. With reference to FIG. 3 and FIG. 4, which show a schematic view from the blade flange 18 to the rotor blade, wherein a single profile of the rotor blade is shown in the center of the rotor blade, the position of sensors 11 through 14 is indicated. Two similar sensors 11 and 13 or 12 and 14 are arranged opposite each other. The axes through the sensors 11 and 13 as well as 12 and 14 lie mainly perpendicular to each other.

In FIG. 3, in which the scenario of an operating position of the rotor blade 15 with a blade angle close to 0° is shown, the main axes YB' and XB' of the rotor blade cut 15 coincide with the blade flange axes YB and XB. With the simplified assumption that the blade bending moments are supplied homogeneously to the cylindrical part, sensors that are installed or arranged in the main blade axes are generally used. These sensors 11-14 are also shown schematically. They can also naturally be installed inside the blade flange 18. FIG. 3 also shows that the sensors 11-14 are connected with calibration modules 22, 22', which are connected with a control and/or regulation device 23. In an advantageous further embodiment, the calibration modules 22, 22' are combined in one single unit.

FIG. 4 shows a corresponding representation of a rotor blade 15 twisted with pitch angle 42. The corresponding main axes YB' and XB' are twisted around the pitch angle 42 of the axes YB and XB. A wind 24 with a corresponding wind direction is also shown.

Figure 5:
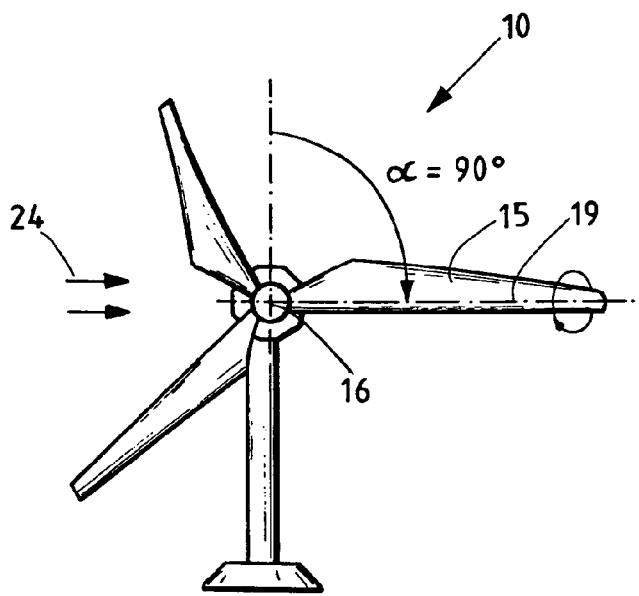
FIG. 5 shows a schematic view of a wind power plant.

In a first step for the calibration process, the rotor blade 15 to be calibrated according to FIG. 5 can be aligned horizontally or level, i.e. the blade axis 19 is aligned horizontally. The rotor azimuth angle α for this blade is thus 90°. In the case of little wind, i.e. in the case of a wind speed that lies clearly below the startup speed of the wind power plant, the wind power plant 10 can remain idle directly in the wind.

Figure 6:
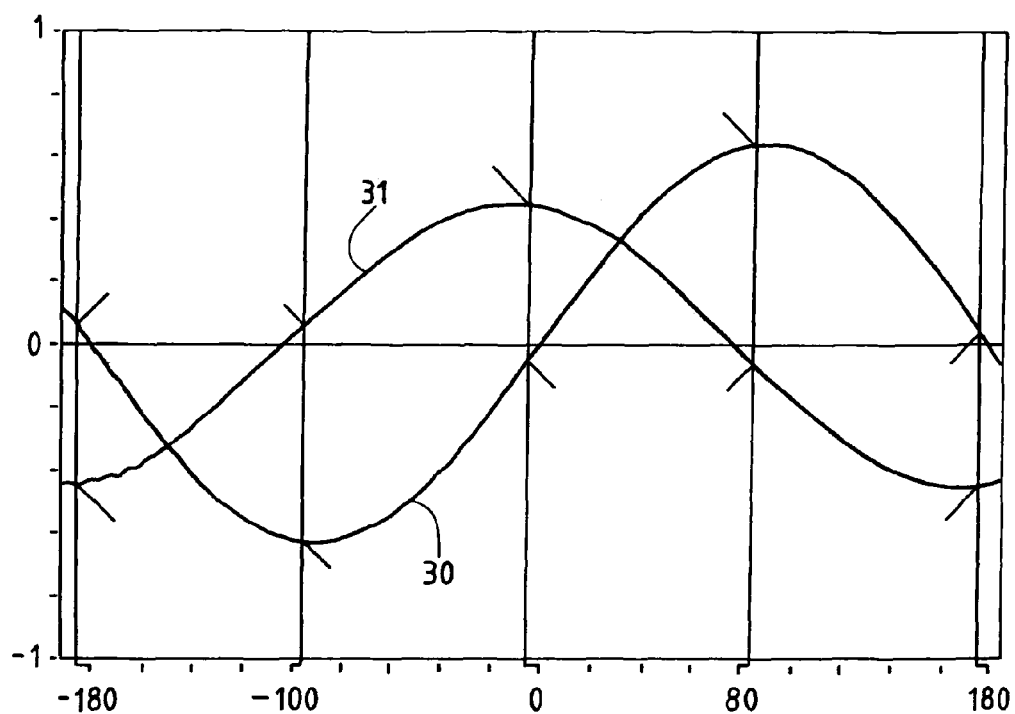
FIG. 6 shows a measurement signal diagram.

FIG. 5 shows a situation, in which the average wind speed of the nacelle anemometer, not shown, lies between a startup speed of the wind power plant and 7 m/s. The nacelle has hereby been moved counter-clockwise by 90° when seen from above so that the rotor blade 15 is arranged in the wind direction or in a type of feathering position. The rotor blade 15 can now be pitched in a range from −190° to 190° so that corresponding sensor signals can be recorded. A corresponding representation of signals measured in this manner is shown in FIG. 6. The cone angle β preferably has no impact on the moment progression in the case of a blade rotation shown above.

FIG. 6 shows raw signals from two sensors 11 to 14, wherein two orthogonally aligned sensors, for example sensors 11, 12 or 13, 14 can be used. The measurement curve 30 concerns the signal for the impact moment and the measurement curve 31 concerns the signal for the swing moment. A voltage in volts is shown on the ordinate, wherein this voltage is connected to the operational amplifier, which amplifies the signal of the respective sensor. The pitch angle positions of the rotor blade are shown on the abscissa. The graphic in FIG. 6 shows the raw signals of two sensors 11 and 12 in the main axes or more exactly with an angular offset to the main axes. Strain gauge strip measurement points were hereby used. The measurement point in the swing direction was attached to the blade bond seam offset by 5.8° so that a displacement of the maxima relative to the zero point or to 90° results. The measurement signals are applied via the pitch angle of the rotor blade in the case of a pitch run of −190° to 190°.

Taking into consideration the present axis tilt of 6° and the idealized assumption that the cylindrical part behind the blade flange can be considered a homogeneous cylinder and the mass center lies on the pitch rotational axis, it is assumed that in the case of angle −186°, −96°, −6°, 84° and 174° the static tare weight moments with respect to impact moment and swing moment reach their maximum. Measurement voltages SF and SE are now collected at these points. Based on these collected measurement voltages, the bending moments are determined with known crosstalk coefficients. The crosstalk coefficients serve to be multiplied with an analogous measurement signal in order to determine the current bending moments. The crosstalk coefficients thus determined for certain angles then apply to the entire curve, i.e. also for other angles.

From the initial equations $$S_F = A_1 \times M_F + A_3 \times M_E \quad (1.1) \text{ Equation 1}$$

and $$S_E = A_2 \times M_F + A_4 \times M_E \quad (1.2) \text{ Equation 2}$$

wherein these initial equations are used for linear sensors, the coefficients $A_1$ through $A_4$ can be determined directly from the signal values SF and SE from the graphic from FIG. 6 at the corresponding positions −186°, −96°, −6°, 84° and 174° (in the case of an axis tilt of 6°). It should hereby be taken into consideration that $S_F$ is the measurement signal for the impact moment and $S_E$ is the measurement signal for the swing moment and $M_F$ the impact moment and $M_E$ the swing moment.

A pitch angle of −180°, 0° or 180° is provided for the first case. The pitch angles are idealized. The axis tilt must also be taken into consideration, i.e. a pitch angle of −186°, −6° and 174° must be selected for example like above. The impact moment is hereby 0 so that $A_3$ and $A_4$ directly result when the swing moment is known. In the case of an angle of −90° and 90° (or −96° and 84°), the swing moment is equal to 0 so that the coefficients $A_1$ and $A_2$ directly result when the impact moment is known.

Thus, for the impact moment $M_F = D_1 S_F + D_3 S_E$ and for the swing moment $M_E = D_2 S_F + D_4 S_E$ with $N = A_1 \times A_4 - A_2 \times A_3$ and $D_1 = A_4/N$, $D_3 = -A_3/N$, $D_4 = A_1/N$, $D_2 = -A_2/N$.

In the case of angle-offset sensors, the angle offset should be compensated for mathematically through recourse to the approximately orthogonally located sensors. The mathematical compensation takes place for example via known transformation matrices containing mainly sine and cosine shares. In this case, as opposed to the arrangement shown in FIG. 3, it is advantageous if the calibration module for all four shown sensors is designed as one single unit. Then the complete calibration, including the compensation of the incorrect position of the sensors, can take place before the sensor signals are fed to the regulation device 23. The embodiment of a single calibration module for all sensors also has the advantage that a statistical evaluation process can also average all sensor information without problem.

Figure 7:
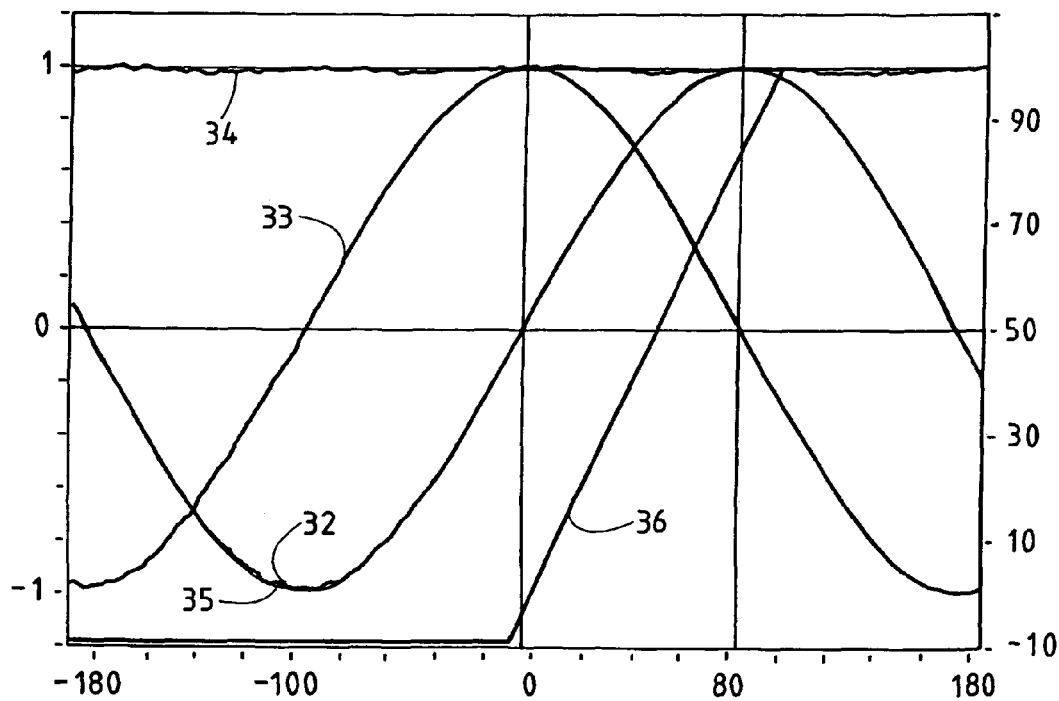
FIG. 7 shows a representation of a diagram of calibrated measurement signals and theoretic values.

This results in correspondingly calculated or calibrated impact moments 32 and a calibrated swing moment 33 from FIG. 7. The Y axis or abscissa is shown standardized in FIG. 7, i.e. a 1 equals the static nominal moment. In order to confirm the theory, the resulting moment from the impact and swing moment is given as an ideal line. This is shown as the calibrated total moment 34 in FIG. 7. The ideal or the theoretical impact moment 35 calculated from the sine of the pitch angle plus the axis tilt sigma multiplied with the static tare weight moment $(\sin(\text{pitch angle}+\sigma) \times M_{Stat})$ runs mainly exactly like the calibrated impact moment 32. The curve 35, namely the theoretically calculated impact moment and the calibrated impact moment 32, correspond to a high degree. For certainty, the measured pitch angle 36 was also applied in the range of −10 to 100°.

Alternatively, it is possible not to measure the full angle area of −190° to 190° or −180° to 180° and to determine the pitch angles $A_1$ through $A_4$ by setting the moments for certain pitch angles to zero. Instead of this, the impact moment can be calculated by the formula $M_F = \sin(\text{pitch angle}+\sigma) \times M_{Stat}$ or the swing moment by $M_E = \cos(\text{pitch angle}+\sigma) \times M_{Stat}$. This even results in correspondingly many initial equations in the case of a pitch run e.g. from 0 to 92° so that the coefficients $A_1$ through $A_4$ can be determined with a sufficient quality. This can take place with a compensation calculation, with which the coefficients are determined, in which the sum of the quadrates of the deviation, for example with the Gaussian principle of compensation, will be a minimum. For this, the rotor blade is preferably brought into the horizontal position and wind loads are minimized to the greatest extent possible.

The calculations just shown apply to sensors, for which a linear connection can be assumed between bending moments and sensor signal. This applies, for example, to the conventional strain gauge strip measurements. For other sensors, for example those with a hysteresis that measure axial bolt forces, it makes sense to provide or adjust the conversions more exactly, for example by using a Taylor series, which is broken off after the quadratic or the cubic member. In order to provide an automatic calibration routine, it is particularly preferred to specify the rotor azimuth angle a with an accuracy of at least +/−1°.

A calibration process according to the invention can now be designed such that the wind conditions are first checked. A 5-minute average can be selected for this for example. If the wind speed is less than e.g. 3 m/s or 5 m/s or 7 m/s in the 5-minute average, a calibration is performed.

The system is then stopped and the rotor blade, on which the sensor(s) to be calibrated are arranged, is stopped at an angle position of 90° (preferably +/−0.5°). A rotor brake is then inserted. If applicable, the system is turned out of the wind, the nacelle is moved e.g. 90° to the left when seen from above, when the wind speed is below a specifiable startup wind speed. A pitch run for the rotor blade is performed in a maximum potential range, for example −190° through +190°. Driving speeds less than or equal to 6°/s come into consideration as the pitch rate.

The signals $S_F$ and $S_E$, i.e. raw data from the sensors on the swing moment and the impact moment, and the pitch angle should be recorded as measurement variables. These signals are preferably captured with a sample rate of at least 100 ms. An even shorter distance between the measurements is preferably provided. The crosstalk coefficients, as described above, are determined from the determined measurement values. A moment progression with an idealized calculated moment progression is now compared with the determined coefficients for the measurement pitch run. If the deviations between the measured moment progression or the calibration impact moment and the calibrated swing moment deviate by less than 3% when compared with the theoretical moments, then the measurement is considered valid and the system is released and restarted. If the deviation lies outside of the tolerance range of 3%, the crosstalk coefficients are correspondingly adjusted and the measurement process is performed again. If the deviation is still too high after several of these iteration steps, an error signal can be created, which thereby enables the specification that one or more sensors are defective or that the environmental conditions, e.g. due to a wind speed that is high and/or wind turbulence, do not permit a sufficiently exact calibration.

Alternatively to the securing or braking of the wind power plant or of the rotor, the calibration process can also take place during the trundling of the rotor blades, wherein a statistical evaluation hereby takes place through the recording of several similar signals, i.e. several measurement signals at the same pitch angle, but at different rotor azimuth angles α. An averaging of the measured impact moments and swing moments is then performed for different azimuth angles α and the same pitch angles and these are then compared with the idealized curve or the idealized moment progression.

A calibration process for a hub or shaft sensor system can be designed such that several rotations of the rotor (hub or shaft) can be provided, while the rotation angle and the corresponding moments are recorded by the corresponding sensors. A calibration of the sensors can then take place through a least squares procedure or corresponding statistics.

The calibration process is preferably performed when there is little to no visibility, for example in the dark or in the fog. Visibility detection is preferably provided for this or a method or a device for visibility detection, which outputs a signal, which specifies in particular an authorization for the performance of a calibration process if a specifiable visibility is not met.

LIST OF REFERENCES

10 Wind power plant
11-14 Sensor
15, 15', 15" Rotor blade
6 Hub
17 Shaft
18 Blade flange
19 Blade axis
20 Shaft axis
22, 22' Calibration module
23 Control and/or regulation device
24 Wind
30 Measurement curve impact moment
31 Measurement curve swing moment
32 Calibrated impact moment
33 Calibrated swing moment
34 Calibrated total moment
35 Theoretical impact moment
36 Measured pitch angle
40 Nacelle
41 Tower
42 Pitch angle
α Azimuth angle
σ Axis tilt
β Cone angle
XB Axis
YB Axis
ZB Axis
$M_{YB}$ Moment around axis YB
$M_{XB}$ Moment around axis XB

The invention claimed is:

1. Method for the operation of a wind power plant that includes a method for the calibration of at least one sensor, wherein the wind power plant has at least one movable component, comprising the steps of:
   pivoting or rotating the movable component on a predeterminable axis and
   evaluating a measurement value captured by the at least one sensor, which is a measure for the load of the movable component,
   wherein the calibration method is performed automatically and the calibration method is initiated by a calibration signal,
   stopping the wind power plant after the initiation of the calibration method by the calibration signal or performing the calibration method during trundling of the wind power plant,
   wherein the evaluation step includes that in the case of a deviation of the captured measurement value, adjusted by a calibration function, from a specifiable and/or saved and/or determined reference, which is greater than a specificable deviation setpoint value, the measurement value adjusted by the calibration function is the basis for the creation and saving of an adjusted calibration function, and
   wherein the evaluation step includes that in the case of a deviation of the captured measurement value from a specifiable and/or saved and/or determined reference, which is greater than a specifiable deviation threshold value, the captured measurement value is the basis for the creation and saving of the adjusted calibration function.

2. Method according to claim 1, wherein a plurality of measurement values of the at least one sensor is recorded and/or evaluated during the pivoting or rotating of the component.

3. Method according to claim 2, wherein the reference comprises a plurality or a function of setpoint values, which are specifiable and/or saved and/or determined.

4. Method according to claim 1, wherein the creation and saving of an adjusted calibration function is repeated.

5. Method according to claim 1, wherein the evaluation and the calibration method take place automatically.

6. Method according to claim 1, wherein the measurement values are recorded with a frequency of 0.01 Hz to 1000 Hz.

7. Method according to claim 1, wherein the measurement values are recorded over the full range of the pivoting or rotating.

8. Method according to claim 1, wherein the movable component is a rotor blade and/or a hub and/or a shaft.

9. Method according to claim 1, wherein the axis is a rotor shaft axis or a rotor blade longitudinal axis.

10. Method according to claim 8, wherein if the component is a rotor blade, the pivoting or rotating occurs over more than 90°.

11. Method according to claim 8, wherein if the component is a hub and/or a shaft, the pivoting or rotating occurs over several revolutions.

12. Method according to claim 4, wherein an error signal is created when a complete calibration process repeated in a specifiable number of iterations causes the deviation of the measurement value adjusted with the calibration function from the reference to be greater than the specifiable deviation setpoint value.

13. Method according to claim 1, wherein the at least one sensor is a load sensor.

14. Method according to claim 1, wherein a control and/or regulation device and also a calibration module are provided, wherein the calibration module performs the calibration of the measurement values and transmits the calibrated values of the control and/or regulation device as input parameters.

15. Method according to claim 14, wherein the control and/or regulation device controls and/or regulates the operation of the wind power plant.

16. Method according to claim 14, wherein the calibration module is integrated in the control and/or regulation device.

17. Method according to claim 1, wherein a rotor blade of the wind power plant is brought into a mainly specifiable position after the initiation of the calibration process by the calibration signal.

18. Method according to claim 17, wherein the rotor blade is moved to a specifiable position relative to the wind direction.

19. Method according to claim 18, wherein the rotor blade is moved into a mainly horizontal position.

20. Wind power plant with a calibration module for the, automatic, calibration of at least one sensor, which measures the load of a movable component of the wind power plant, wherein the calibration module for the execution of a calibration process is designed according to claim 1.

21. Wind power plant according to claim 20, wherein a control and/or regulation device is also provided, which is connected with the calibration module or into which the calibration module is integrated.

* * * * *